United States Patent [19]

Ueki et al.

[11] 4,404,604
[45] Sep. 13, 1983

[54] DEVICE FOR DETECTING A NON-RECORDED SEGMENT ON MAGNETIC TAPE

[75] Inventors: Yoshiharu Ueki; Shouzaburou Sakaguchi, both of Kawagoe, Japan

[73] Assignee: Pioneer Electronic Corporation, Tokyo, Japan

[21] Appl. No.: 254,326

[22] Filed: Apr. 14, 1981

[51] Int. Cl.³ .................. G11B 27/22; G11B 19/10; G11B 15/52

[52] U.S. Cl. ................................. 360/71; 360/72.1; 360/74.4

[58] Field of Search .............. 360/71, 74.4, 72.1, 360/72.2, 73, 74.1

[56] References Cited

U.S. PATENT DOCUMENTS

| | | | |
|---|---|---|---|
| Re. 30,416 | 10/1980 | Yasunaga | 360/74.4 |
| 3,461,249 | 8/1969 | Kamoji et al. | 360/74.4 |
| 3,573,393 | 4/1971 | Blackie et al. | 360/74.4 |
| 3,893,177 | 7/1975 | Takenaka | 360/72.1 |
| 4,151,566 | 4/1979 | Ohrman | 360/72.1 |
| 4,270,152 | 5/1981 | Ida | 360/74.4 |
| 4,288,823 | 9/1981 | Yamamoto et al. | 360/74.4 |
| 4,290,090 | 9/1981 | Yamamoto et al. | 360/74.4 |
| 4,323,935 | 4/1982 | Koizumi et al. | 360/74.4 |

*Primary Examiner*—Alfred H. Eddleman
*Attorney, Agent, or Firm*—Sughrue, Mion, Zinn, Macpeak and Seas

[57] ABSTRACT

A device for accurately detecting non-recorded segments on a magnetic tape in fast-forward and rewind modes. The output of a magnetic head is coupled through an equalizer amplifier and limiter amplifier to convert it to a digital pulse signal which is applied to the clear input of a counter the clock input of which is coupled to an oscillator. A higher order output bit is connected to the clock input of a flip-flop which controls solenoids for setting the fast-forward and rewind modes. When no pulses of the digital pulse signal are received within a predetermined period, indicative of the presence of a non-recorded segment, the counter produces an output signal which operates the flip-flop.

3 Claims, 1 Drawing Figure

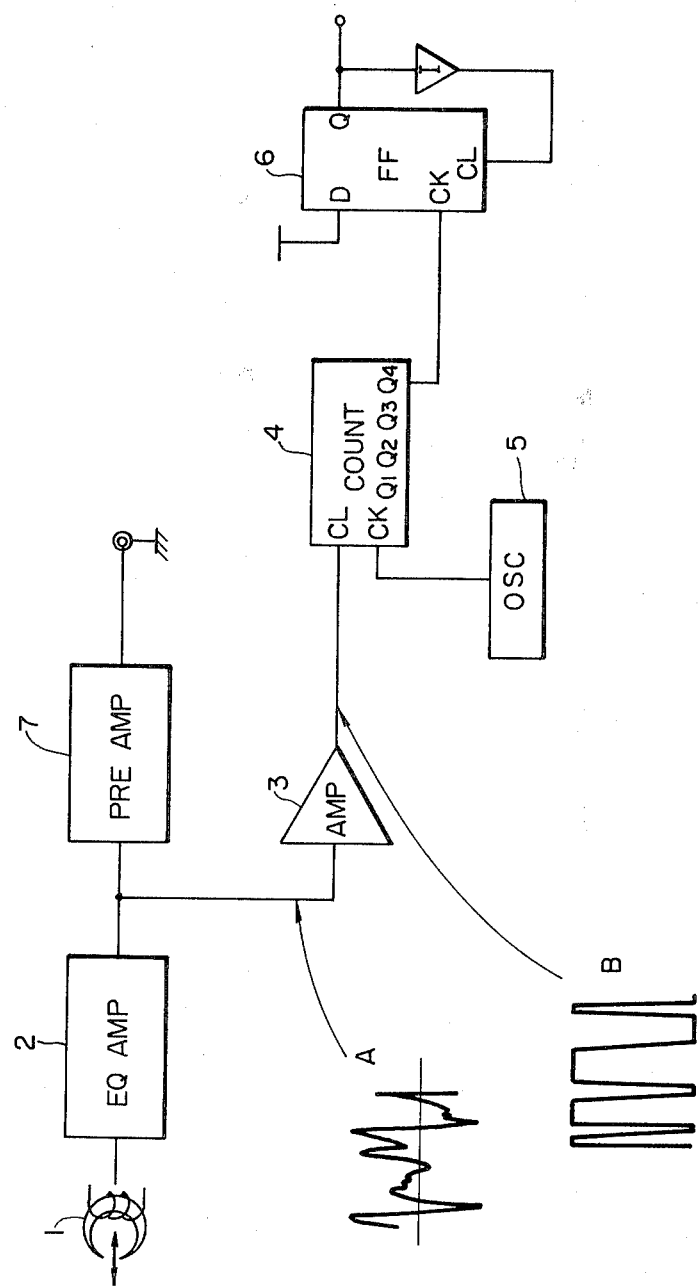

DEVICE FOR DETECTING A NON-RECORDED SEGMENT ON MAGNETIC TAPE

BACKGROUND OF THE INVENTION

The present invention relates to a detecting device for detecting a non-recorded segment interposed between recorded segments on a magnetic tape during a fast-forwarding or playback mode.

Heretofore, detection of a non-recorded segment interposed between recorded segments on magnetic tape has been carried out in such a manner that the tape is brought into contact with a magnetic head during the fast-forwarding, rewinding or playback mode to pick up recorded signals, the signal thus picked up is thereafter amplified and is further filtered by a low-pass filter, and a low level output of the low-pass filter is sensed to detect the non-recorded segment. This technique is disadvantageous in that a set time for determining the non-recorded segment tends to vary because variations in the value of a capacitor and a resistor constituting the low-pass filter cause variations in the time constant of the low-pass filter. It is further disadvantageous in that, even if the device is formed with an IC, the total number of components including those coupled to the IC is high.

In view of the foregoing, an object of the invention is to provide a device for detecting non-recorded segments on a tape in which the detection operation is carried out digitally thereby allowing the device to be easily implemented with an IC.

SUMMARY OF THE INVENTION

In accordance with this and other objects of the invention, there is provided a device for detecting non-recorded segments on a magnetic tape including oscillator means for producing clock pulses of a predetermined frequency, counter means having a clear input terminal and a clock terminal with the clock pulses applied to the clock input terminal, and means for applying a digital signal corresponding to a reproduced signal to the clear input terminal. The counter means produces an output signal when the digital signal represents that the duration of a non-recorded segment is longer than a predetermined time. Preferably, the means for applying the digital signal includes an equalizer amplifier the input of which is coupled to the output of a magnetic head and a limiter amplifier which amplifies and limits the output of the equalizer amplifier. Also, a flip-flop having a clock input terminal coupled to receive the output signal of the counter means can be provided with at least an output of the flip-flop controlling fast-forward and rewind modes within the tape recorder.

BRIEF DESCRIPTION OF THE DRAWINGS

The single FIGURE is a circuit diagram of a preferred embodiment of a detecting device of the invention.

DESCRIPTION OF THE PREFERRED EMBODIMENT

A preferred embodiment according to the invention will be described with reference to the single FIGURE.

A reproduced signal obtained from a magnetic head 1 is inputted to an equalizer amplifier 2, the output of which, signal A, is applied to both a preamplifier 7 and a limiter amplifier 3. In the limiter amplifier, the signal A is subjected to amplification by about 60 decibels and limited to provide an output signal having a waveform shaped as signal B shown in the FIGURE. The signal B thus obtained is applied to a clear terminal CL of a counter 4 to the clock terminal of which clock pulses are constantly applied from an oscillator 5. The output $Q_X$ (in the embodiment described, $Q_4$) of the counter 4 is fed to a clock terminal CK of a D-type flip-flop 6 as a set signal. The Q output of the flip-flop 6 is used as a control signal for controlling solenoids which have plungers which set the fast-forward or rewind mode so as to halt the tape running. The Q output of the flip-flop 6 is coupled to a clear input terminal CL of the flip-flop 6 through an inverter. Accordingly, the clear input is rendered LOW when the Q output of the flip-flop 6 is HIGH.

In the fast forward or rewind mode, the counter 4 is cleared when the signal B is present. Therefore, the output $Q_4$ of the counter 4 is maintained in the LOW state as long as a reproduced signal is present. During the playback of non-recorded segments on the tape, the signal B applied to the clear terminal of the counter 4 is in the LOW state. During this time, the counter 4 counts the clock pulses outputted from the oscillation circuit 5. When the counter counts more than a predetermined number of the clock pulses, the output $Q_4$ of the counter 4 changes to HIGH to thereby set the flip-flop 6. As a result, the output Q of the counter 4 is rendered HIGH. In this manner, a signal indicating the presence of non-recorded segments on the tape is obtained. If the duration of a non-recorded segment is within a preset period of time, the non-recorded segment detecting signal is not produced because the counter 4 is cleared prior to the counting of the predetermined number of the clock pulses.

As is apparent from the above description, in accordance with the invention it is possible to preset the time for determining non-recorded segments on a tape as desired or to change the time therefor because the time therefor is set by a count of a number of clock pulses. Moreover, very precise operations can be performed if the frequency of the clock pulses is made sufficiently high. Furthermore, if the control of the overall tape recorder system is implemented with a microcomputer, the clock applied to the microcomputer can be used as the clock signal applied to the counter upon effecting frequency division of the clock pulse signal. In such a case, the device according to the invention can be formed with a simpler IC chip.

What is claimed is:

1. A device for detecting non-recorded segments of a predetermined minimum length on a magnetic tape comprising: oscillator means for producing clock pulses of a predetermined frequency; multi-bit counter means having a clear input terminal and a clock terminal, said clock pulses being applied to said clock input terminal; and means for applying a digital signal corresponding to a reproduced signal to said clear input terminal, an output signal indicative of the presence of a non-recorded segment being produced at a higher order bit output of said counter means.

2. The detecting device of claim 1 wherein said means for applying a digital signal corresponding to a reproduced signal comprises an equalizer amplifier having an input coupled to an output of a magnetic head and a limiter amplifier having an input coupled to an output of said equalizer amplifier, said limiter amplifier outputting said digital signal.

3. The device as claimed in claim 1 or 2 further comprising a flip-flop having a clock input coupled to receive said output signal from said counter means, said flip-flop having an output coupled to operate solenoids controlling at least fast-forward and rewinding modes.

* * * * *